(12) United States Patent
Zhang et al.

(10) Patent No.: US 6,556,778 B2
(45) Date of Patent: Apr. 29, 2003

(54) ACTIVE CURRENT-LIMITING CONTROL FOR DC MOTOR SPEED REGULATION

(75) Inventors: Qiusheng Zhang, Plymouth, MI (US); Ashraf Zeid, Troy, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/938,169

(22) Filed: Aug. 23, 2001

(65) Prior Publication Data

US 2003/0039473 A1 Feb. 27, 2003

(51) Int. Cl.[7] ................................................. H02P 5/28
(52) U.S. Cl. ........................ 388/806; 388/800; 318/432; 318/434
(58) Field of Search ................................. 318/432, 434, 318/599, 139; 388/831, 811, 903, 806, 800

(56) References Cited

U.S. PATENT DOCUMENTS

| | | | |
|---|---|---|---|
| 4,841,207 A | * 6/1989 | Cheyne | 388/811 |
| 4,958,269 A | 9/1990 | Gritter | 364/153 |
| 5,000,278 A | * 3/1991 | Morishita | 180/446 |
| 5,557,182 A | * 9/1996 | Hollenbeck et al. | 318/432 |
| 5,859,510 A | 1/1999 | Dolan et al. | |
| 6,104,149 A | 8/2000 | Pelly | |
| 6,127,793 A | 10/2000 | Kerner | |
| 6,170,241 B1 | 1/2001 | Shibilski et al. | |
| 6,208,159 B1 | * 3/2001 | Klosterman | 324/772 |

FOREIGN PATENT DOCUMENTS

| | | | |
|---|---|---|---|
| SU | 1236594 | 6/1986 | H02P/5/06 |
| SU | 1264286 | 10/1986 | H02P/5/06 |
| WO | WO 91/15379 A1 | 10/1991 | B60L/11/18 |

OTHER PUBLICATIONS

UK Patent Office Combined Search & Examination Report, pp. 1–4.

* cited by examiner

Primary Examiner—Karen Masih
(74) Attorney, Agent, or Firm—Brinks Hofer Gilson & Lione

(57) ABSTRACT

A motor controller for regulating the speed and limiting the input current to a dc motor is disclosed. The motor controller includes an electronic control unit, a current sensor and a speed sensor. The motor controller provides control of the dc motor by applying a varying voltage to maintain a motor speed in the presence of a varying load. The motor controller also monitors the input current to the dc motor to predict an input current to the dc motor. The ECU compares the predicted input current to a input current limit range and switches to a current-limiting mode when it determines that an overcurrent condition is reached based on the comparison. The motor controller modifies the control signal by a first control decay factor when the predicted input current exceeds the input current limit range. The motor controller modifies the control signal by a second control decay factor when the predicted input current is within the input current limit range level. When the input current has stabilized less than the input current limit range, the motor controller modifies a target motor speed to returns to a speed-regulating mode.

28 Claims, 2 Drawing Sheets

ACTIVE CURRENT-LIMITING CONTROL FOR DC MOTOR SPEED REGULATION

FIELD OF THE INVENTION

The invention relates generally to the field of motor controllers. In particular, this invention relates to an active speed regulating and current-limiting motor controller for dc motors and methods thereof.

DESCRIPTION OF THE RELATED ART

A direct-current ("dc") motor operates at a rotational speed that varies with changes in a load applied to the dc motor and an input voltage applied to an input for the dc motor. Electronic control units ("ECU") coupled with the input to dc motor are commonly used to regulate the speed of the dc motor. The ECU controls the speed of the dc motor by controlling the input voltage in response to rotational speed of the dc motor. The ECU monitors the speed and adjusts the input voltage to compensate for differences in the speed from a programmed desired speed.

In a conventional configuration, the ECU is coupled with electronic sensors that generate signals associated with the actual speed of the dc motor. The ECU compares the actual speed with a desired speed programmed into the ECU. When the ECU determines that the actual motor speed differs from the desired motor speed, the ECU calculates a new input voltage that will compensate for the difference according to known motor control algorithms. The ECU then varies the input voltage to the calculated input voltage to adjust the motor speed towards the programmed motor speed.

Input current to the dc motor also depends on the load on and the speed of the dc motor. As a load on the dc motor increases, the input current to the dc motor also increases. When motor speed becomes too large relative to an existing load on the dc motor, the input current to the dc motor also increases. To prevent damage to the dc motor and input circuitry for the dc motor, the input current man be limited to a maximum.

One method for limiting current to the dc motor includes implementing hardware devices that disconnect the input voltage and input current to the dc motor when it is determined that the input current exceeds a maximum value. Hardware implementations may include blowing a series fuse or resettable circuit breaker when the input current exceeds the maximum. Other hardware implementations include opening an in-line transistor when the maximum current is detected. Because the dc motor is completely shutdown, the hardware implementations may be undesirable for certain applications. For example, restart of the dc motor may require a lengthy restart procedure, requiring an undesirably long down time. In other applications, continuous operation of the dc motor is critical, so the maximum current level is set at a conservatively high level and may not afford adequate protection for the dc motor and input circuitry.

An ECU may be programmed to limit the input current using a dc control feedback. The technique includes measuring the input current to the ECU while varying the input voltage to control the dc motor speed. When a maximum input current is exceeded, the ECU varies the input voltage to decrease the input current. Because the input voltage is decreased, the speed of the dc motor also decreases, which the ECU is programmed to control. The ECU will then detect the decreased speed and compensate by increasing the input voltage. Accordingly the ECU may cycle the input voltage up and down until the speed equalizes back to the desired speed. Accordingly, an ECU programmed for dc control feedback contradicts the objectives for speed regulation.

Another method for dc current control includes programming the ECU to digitally sample the input current and adjust the input current based on the digital sampling. However, because the input current varies faster than the dc motor speed, the sampling frequency for speed regulation may be too low to also effectively control the input current dynamics. Increases in the sampling rate to provide effective control for the input current dynamics increase the costs in providing dc motor control. In addition, programming the ECU with a dual sampling rate increases the complexity of the dc control and also increases the cost for the dc control.

Accordingly, there is a need for an ECU to provide active current-limiting control for dc motors while providing speed regulation for the dc motor with a relatively low and efficient sampling rate.

BRIEF SUMMARY

An embodiment of the motor controller includes a programmable electronic control unit (ECU) configured to control the rotational speed of the motor under varying load conditions and additionally to actively limit an input current to the dc motor. The ECU is configured to provide speed control for the dc motor while actively providing overcurrent protection for the dc motor. The motor controller provides a number of advantages over prior motor controllers that provide overcurrent protection through the use of hardware devices, such as relays or thermo cutoffs, and software techniques, such as direct current control algorithms.

In one embodiment for the active speed-regulating and current-limiting dc motor controller includes a speed sensor, a current sensor coupled with an input to the dc motor, the current sensor, and an electronic control unit ("ECU"). The speed sensor may be mechanically coupled with the dc motor and configured to generate an electrical signal associated with a rotational speed of a dc motor. The speed sensor includes a speed sensor output, at which the electrical signal is provided. The current sensor may also be coupled with a dc motor input. The current sensor is configured to generate an electrical signal associated with a current level at the dc motor input. The current signal is provided at a current sensor output.

The ECU includes a first input, a second input, and an output. The first input is coupled with the speed sensor output and configured to receive the speed signal and the second input is coupled with the current sensor output and configured to receive the current signal. The ECU is operative generate a motor control signal at the output. The motor control signal is based on a comparison of the speed signal at the first input with a programmed desired rotational speed. The ECU is programmed to modify the control signal based on a comparison of the current signal at the second input with a programmed input current limit range. When the ECU determines that the input current is within or exceeds the input current limit range, the ECU modifies the control signal by a control decay factor. The ECU may include any programmable proportional integral derivative (PID) control unit device capable of accepting input signals from sensors, comparing the input signals with predetermined values, and generating an output signal based on the comparison of the input signals to the predetermined values. The control decay factors may be selected to provide the desired current limitations for the specific application.

An embodiment for a method for regulating dc motor speed includes the acts of: monitoring a rotational speed of the dc motor to determine whether the speed complies with a desired speed; generating a motor control signal in response to the determination comparison of the speed signal and a desired speed; monitoring an input current to the dc motor to determine whether an input current to the dc motor complies with an input current limit range; and modifying the motor control signal by a first control decay factor when it is determined that the input current exceeds the input current limit range. The method may further include modifying the motor control signal by a second control decay factor when it is determined that the input current is substantially within the input current limit range.

The foregoing discussion of the summary of the invention is provided only by way of introduction. Nothing in this section should be taken as a limitation on the claims, which define the scope of the invention. Additional objects and advantages of the present invention will be set forth in the description that follows, and in part will be obvious from the description, or may be learned by practice of the present invention. The objects and advantages of the present invention may be realized and obtained by means of the instrumentalities and combinations particularly pointed out in the claims.

DETAILED DESCRIPTION OF THE PREFERRED EMBODIMENTS

The embodiments described herein relate to a direct current ("dc") motor controller and methods thereof. The dc motor controller is coupled with a dc motor. Herein, the phrase "coupled with" is defined to mean directly connected to or indirectly connected through one or more intermediate components. Such intermediate components may include both hardware and software based components.

The illustrated embodiments provide a motor controller operative to actively provide speed regulation and overcurrent protection for a dc motor. In an embodiment, the dc motor is configured to provide on-demand torque for an electro-hydraulic power-assisted steering system adapted for a motorized vehicle. The motor controller may include a programmable electronic control unit ("ECU"), and sensors configured to detect operational parameters of the motor, such as an input current and rotational speed. The motor controller is programmed with a desired speed for the dc motor. The motor controller monitors the rotational speed of the dc motor under varying load conditions. The motor controller generates a control signal to the dc motor to actively adjust the actual rotational speed towards the desired rotational speed. The motor controller generates the control signals for the dc motor according to known motor control methods and algorithms.

The motor controller is additionally configured to monitor an input current to the dc motor. When the motor controller detects that the input current exceeds an input current limit range for the dc motor, the ECU modifies the control signal by a first control decay factor. When the ECU determines that the input current in within an input current limit range, the ECU modifies the control signal by a second control decay factor. No modifications are made to the control signals when it is determined that the input current is less than the input current limit range.

Figure 1:
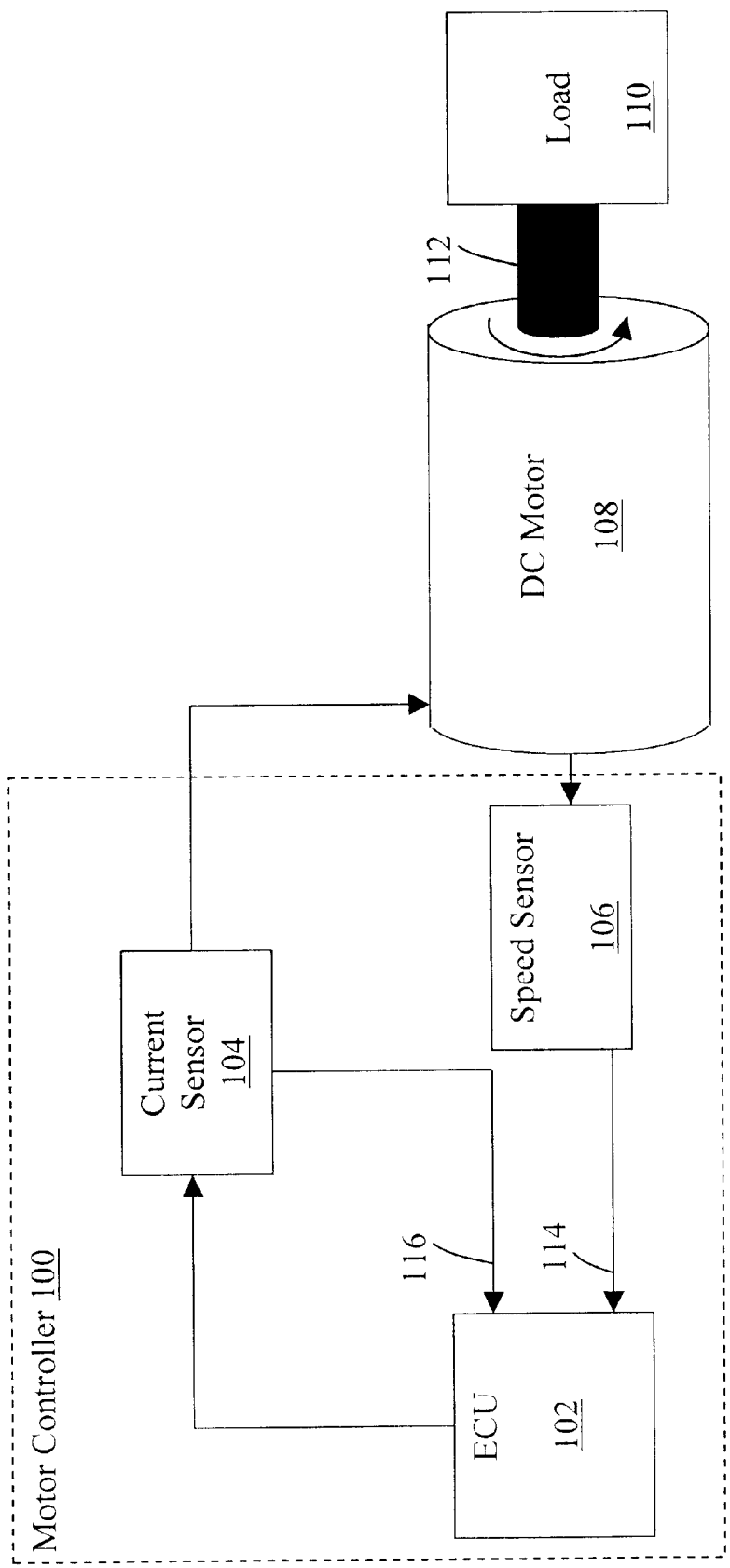
FIG. 1 illustrates an embodiment of an active speed limiting and current limiting dc motor controller.

Referring to FIG. 1, an embodiment for an active current-limiting and speed regulating motor controller 100 is shown. The motor controller 100 is coupled with a dc motor 108. The dc motor 108 has a rotor 112 that is characterized by a rotational speed. The rotational speed of the rotor 112 is related to both an input voltage to the dc motor and the magnitude of the load 110. With a constant load 110 on the dc motor 108, increases in the input voltage will result in an increase in the rotational speed of the dc motor. Conversely, a decrease in the input voltage results in a decrease of the rotational speed of the rotor 112. With a constant voltage input to the dc motor 108, the rotational speed will decrease with an increase in the load 110 and will increase with a decrease in the load 110.

The dc motor 108 may be any size or type of dc motor. For example, the dc motor may be a dc stepper motor or a dc brushless motor. The size of a conventional dc motor 108 is characterized by an input rating, including an input current rating and an input voltage rating. The size of the dc motor may also be characterized by a horsepower rating. Because the size of the motor is related to the load 110, the size of the dc motor is selected based on the application of the load 110.

The motor controller 100 is configured to regulate the rotational speed of the dc motor 108 that is mechanically coupled with a varying load 110. The motor controller 100 controls the speed of the dc motor 108 by varying the input voltage to the dc motor 108 to compensate for changes in the load 110. In an embodiment, the load 110 may be a hydraulic pump that provides hydraulic pressure to an electro-hydraulic power assisted steering system for a motorized vehicle. The hydraulic pressure is converted to mechanical energy and used to provide steering assistance in the motorized vehicle when an operator activates the power steering system. The load 110 on the dc motor 108 will vary with varying driving conditions. For example, as a driver manipulates a steering system of the motorized vehicle, the load on the power steering system will increase. During driving conditions requiring minimal manipulation of the steering system, (e.g. driving in a substantially forward direction) the load will also be minimal. In driving conditions requiring additional manipulation of the steering system. (e.g. steering the vehicle around a 90 degree radius) the load 110 on the dc motor 108 will also increase. For the electrohydraulic power assisted steering system to provide smooth operation of the steering system under the varying load conditions, the speed of the motor 108 varies to compensate for changes in the varying load 110. Accordingly, the motor controller 100 is configured to regulate the rotational speed of the dc motor 108 on-demand with changes in the load 110.

The motor controller includes a current sensor 104, a speed sensor 106, and an electronic control unit ("ECU") 102. The current sensor 104 is coupled in series between the ECU 102 and the dc motor 108. The current sensor monitors the input current and input voltage to the dc motor 108. The current sensor 104 generates a signal associated with the input current. The current signal is provided at a current sensor output.

The speed sensor 106 is configured to monitor the rotational speed of the dc motor 108. The speed sensor 106 generates a signal associated with the speed of the dc motor 108. The speed signal is provided at an output for the speed sensor 106.

In an embodiment, the ECU has a first input 114, a second input 116, and an output 118. The ECU output 118 is coupled with the dc motor 108 via the current sensor 104. The first input 114 is coupled with the output of the speed sensor 106. The second input 116 is coupled with the output of the current sensor.

The ECU 102 is configured to monitor the rotational speed of the dc motor 108 as communicated via the speed sensor 106. The ECU 102 samples the speed signal provided by the speed sensor 106 at the first input 114. Based on the sampled signal value, the ECU determines whether to adjust the speed of the dc motor 108. The ECU is programmed to sample the speed signal at a sampling rate known to provide efficient speed control for the dc motor 108.

The ECU 102 may be externally programmed with a desired rotational speed of the dc motor 108. The ECU 102 compares the actual speed as sampled from the speed signal provided at the first input 114 to the programmed desired rotational speed. When the ECU 102 determines that there is a difference between the actual rotational speed and the programmed desired rotational speed the ECU 102 generates a motor control signal at the ECU output 118. The motor control signal provides the input voltage to control the rotational speed of the dc motor 108. The motor control signal is communicated via the current sensor 104 to the dc motor 108. In response to the motor control signal, the rotational speed of the dc motor 108 is adjusted to compensate for the difference between the actual rotational speed and the desired rotational speed.

The ECU 102 is also configured to monitor the input current to the dc motor 108. The ECU 102 may be externally programmed with a desired input current limit range. The input current limit range may have an upper limit that is substantially equal to or higher than the nominal input current rating for the dc motor 108. In some circumstances, the upper limit may exceed the rating of the dc motor 108 by a percentage sufficient to permit operating efficiency for the motor yet provide adequate protection for the dc motor 108. The input current limit range has a lower limit that is a percentage of the motor rating. By way of example, for a dc motor having a 10 Amperes input current rating, the input current limit range may have an upper limit equal to 10 Amperes and a lower limit of 9 Amperes, or 90% of the dc motor rating. The input current limit range may be selected based on the size, and type of the motor and the application of the dc motor 108. In an embodiment, the upper limit is 100% of the dc motor input current rating and the lower limit is substantially 90% of the dc motor input current rating. In another embodiment, the upper limit is 100% of the dc motor input current rating and the lower limit is 95% of the dc motor input current rating.

The ECU 102 receives the current signal from the current sensor 104 at the second input 116. The ECU 102 samples the current signal to determine whether to modify the control signal. The ECU 102 samples the current signal and the speed signal at substantially the same sampling rate. The ECU 102 may be configured to predict the input current to the dc motor 108 according to the following first order approximation equation:

$$I_{k+1}=I_k+[I_k-I_{k-1}]$$ Eq. 1

During a sampling period "k," the input current "$I_k$" is sampled from the current sensor 104. The input current for a subsequent sampling period $I_{k+1}$ is estimated based on an amount of change in input current from a previous sampling period $[I_k-I_{k-1}]$. Accordingly, the input current for the next sampling period $I_{k+1}$ may be predicted. The ECU 102 may also be configured to predict the input current to the dc motor 108 according to higher order approximation equations. For example, the ECU may be programmed according to the following second order approximation equation:

$$I_{k+1}=I_k+[I_k-I_{k-1}]+\tfrac{1}{2}*[I_{k-1}+I_{k-2}]$$ Eq. 2

The ECU 102 compares the predicted input current to the programmed input current limit range. When it is determined that the predicted input current has reached an overcurrent condition the ECU switches to a current limiting mode. For example, when it is predicted that the input current exceeds the input current limit range, the ECU 102 modifies the control signal by a first control decay factor. When the ECU 102 determines that the input current is within the input current limit range, the ECU 102 modifies the control signal by a second control decay factor. When it is determined that the input current is below the input current limit range, the control signal is not modified.

The values for first control decay factor and the second control decay factor are selected to provide a smooth and quick compensation for an overcurrent condition without overshoot or excessive oscillation to the rotational speed. In an embodiment, the first control decay factor may be any value between 0.99 to 0.95 and the second control decay factor may be any value between 1.0 and 0.97. Accordingly, the control signal to the dc motor 108 can be modified by 1% to 5% when the input current exceeds the input current limit range. It is desired that the second control decay factor modify the control signal by a smaller factor than the first control decay factor. Accordingly, when an overcurrent condition occurs, the ECU 102 smoothly transitions from the speed-regulating mode to the current-limiting mode to provide efficient active current limiting control for the dc motor.

When the predicted input current is within the input current limit range the control signal is modified by the second control decay factor. When the control signal is modified, the input voltage to the dc motor 108 is decreased. Accordingly, the dc motor 108 continues to operate, but with a lower input voltage. The ECU 102 continues to operate in the current limiting mode while it is determined that predicted the input current exceeds the input current limit range or is within the input current limit range. When it is determined that the predicted input current to the dc motor 108 is less than the input current limit range, the ECU 102 transitions to speed regulation mode and the control signal is not modified.

In an embodiment, the input current limit range may vary. For example, when the ECU 102 determines that the predicted input current is substantially less than the lower limit of the input current limit range, the ECU 102 may modify the input current limit range to decrease the size of the range. When a large overshoot of the input current limit range occurs, the ECU 102 may reset the lower limit and upper limits of input current limit range to initial programmed values.

The ECU 102 may be any electronic motor controller configured to carry out dc motor speed regulation according to known control algorithms and motor control principles. In an embodiment, the ECU 102 is a proportional integral derivative ("PID") controller having a feedforward and anti-windup design.

Figure 2:
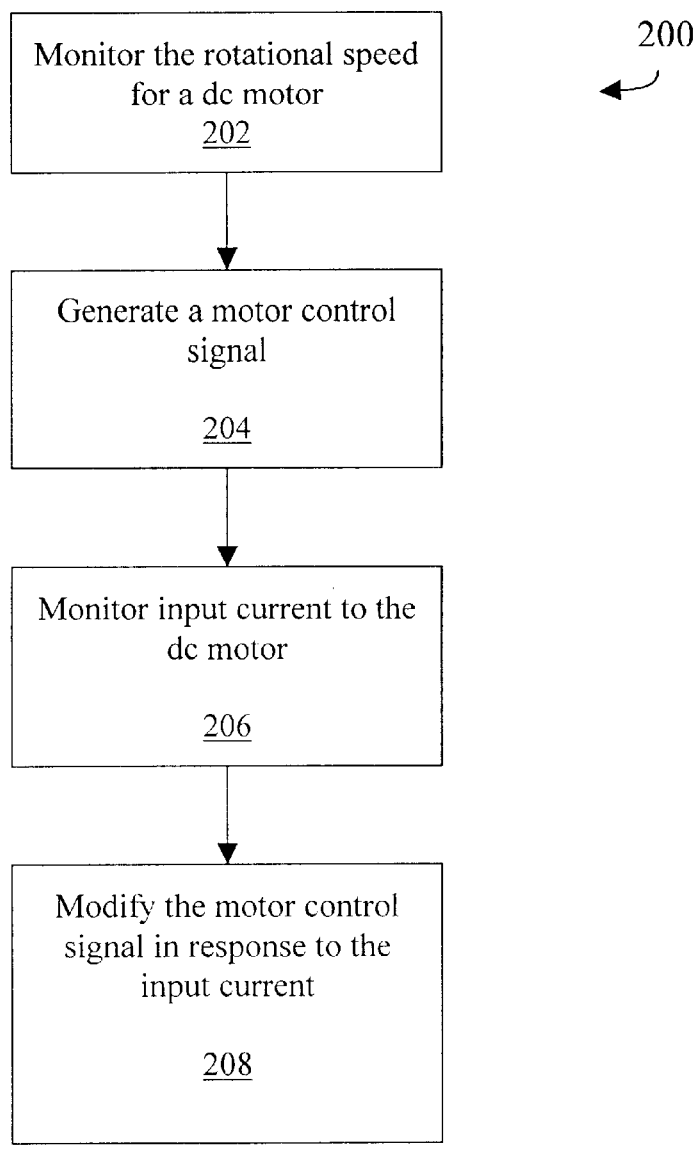
FIG. 2 is a flowchart for an embodiment for a method for regulating dc motor speed.

Referring now to FIG. 2, a flowchart 200 for an embodiment for a method for regulating the speed of a dc motor is shown. The method includes the acts of monitoring 202 a rotational speed of the dc motor; generating 204 a motor control signal; monitoring 206 an input current to the dc motor; and modifying 208 the motor control signal in response to the input current.

The act of monitoring 202 includes determining whether the rotational speed complies with a desired speed. The act of generating 204 a control signal is performed in response to the determination made during the act of monitoring 202 the rotational speed. The control signal compensates for a difference between the rotational speed and the desired rotational speed. The act of monitoring 206 the input current includes determining whether a predicted input current to the dc motor complies with an input current limit range. The act of modifying 208 the control signal includes adjusting the control signal by a first control decay factor when it is determined that the predicted input current exceeds the input current limit range. The act of modifying 208 the control signal may further include modifying the control signal by a second control decay factor when it is determined that the predicted input current is within the input current limit range. It is desired that the second decay factor modify the control signal by a smaller factor than the first control decay factor. In an embodiment, the first decay factor may be any value from 0.99 to 0.95 and the second decay factor may be any value between 1.0 and 0.97.

While particular embodiments of the present invention have been shown and described, modifications may be made. It should be noted that there could be a wide range of changes made to the embodiments described herein without departing from the scope. Different ECU's could be used to control any dc motor designed to specific loads. Thus, it is intended that the foregoing detailed description be regarded as illustrative rather than limiting. It is further understood that the following claims, including all equivalents, are intended to define the scope of the invention.

What is claimed is:

1. An active speed-regulating and current-limiting dc motor controller, comprising:
   a speed sensor operative to generate a signal associated with a rotational speed of a dc motor, the signal being provided at a speed sensor output;
   a current sensor coupled with an input to the dc motor, the current sensor being operative to generate a signal associated with an input current level to the dc motor, the current signal being provided at a current sensor output, and
   an electronic control unit ("ECU") having a first input, a second input, and an output, the first input coupled with the speed sensor output and configured to receive the speed signal, the second input being coupled with the current sensor output and configured to receive the current signal, the ECU being operative to generate a motor control signal at the output based on a comparison of the speed signal at the first input with a programmed desired rotational speed and being operative to modify the control signal based on a comparison of a predicted input current with a programmed input current limit range, the predicted input current being determined by the ECU based on the current signal.

2. The active speed-regulating and current-limiting motor controller according to claim 1, wherein the ECU modifies the control signal by a first control decay factor when the predicted input current exceeds the input current limit range.

3. The active speed-regulating and current-limiting motor controller according to claim 2, wherein the ECU modifies the control signal by a second control decay factor when the predicted input current is substantially within the input current limit range.

4. The active speed-regulating and current-limiting motor controller of claim 3, wherein the first control decay factor is between approximately 0.99 and approximately 0.95.

5. The active speed-regulating and current-limiting motor controller of claim 4, wherein the second control decay factor is between approximately 0.97 and approximately 1.0.

6. The active speed-regulating and current-limiting motor controller according to claim 5, wherein the dc motor is characterized by an input current rating and the input current limit range is between substantially one hundred percent of the input current rating and substantially ninety percent of the input current rating.

7. The active speed-regulating and current-limiting motor controller according to claim 6, wherein the input current limit range is variably controlled between substantially one hundred percent of the input current rating and substantially ninety percent of the input current rating.

8. The active speed-regulating and current-limiting motor controller according to claim 7, wherein the input current limit range is between substantially one hundred percent of the input current rating and substantially ninety-five percent of the input current rating.

9. The active speed-regulating and current-limiting motor controller according to claim 8, wherein the input current limit range is variably controlled between substantially one hundred percent of the input current rating and substantially ninety-five percent of the input current rating.

10. The active speed-regulating and current-limiting motor controller of claim 9, wherein the ECU comprises a proportional integral derivative ("PID") motor controller.

11. The active speed-regulating and current-limiting motor controller of claim 10, wherein the PID is configured to operate using a feedforward and anti-windup algorithm.

12. The active speed-regulating and current-limiting motor controller of claim 11, wherein the ECU determines the predicted input current based on a first order approximation.

13. The active speed-regulating and current-limiting motor controller of claim 11, wherein the ECU determines the predicted input current based on a second order approximation.

14. An active motor controller, comprising:
    a dc motor having an input configured to receive an input current, the dc motor having a rotating shaft characterized by a rotational speed;
    a current sensing means coupled with the dc motor for generating a current signal associated with the input current;
    a speed sensing means coupled with the dc motor for generating a speed signal associated with the rotational speed of the rotating shaft; and
    a speed control means coupled with the current sensing means and with the speed sensing means for predicting an input current and controlling the speed of the dc motor based on a comparison of the speed signal to a programmed desired speed for the dc motor and for modifying the motor control signal based on a comparison of the predicted input current with a programmed input current limit range.

15. The active motor controller of claim 14, wherein the speed control means modifies the motor control signal by a first control decay factor when the predicted input current exceeds an input current limit range and modifies the control signal by a second control decay factor when the current signal level is substantially within the input current limit range.

16. The active motor controller of claim 15, wherein the first control decay factor is between substantially 0.99 and substantially 0.95.

17. The active motor controller of claim 16, wherein the second control decay factor is between substantially 1.0 and 0.97.

18. The active motor controller of claim 17, wherein the dc motor is characterized by an input current rating and the input current limit range is between substantially one hundred percent of the input current rating and substantially ninety percent of the input current rating.

19. The active motor controller of claim 18, wherein the input current limit range is between substantially one hundred percent of the input current rating and substantially ninety-five percent of the input current rating.

20. The active motor controller of claim 19, wherein the input current limit range is variably controlled between substantially one hundred percent of the input current rating and substantially ninety-five percent of the input current rating.

21. A method for regulating dc motor speed comprising the acts of:

monitoring a rotational speed of the dc motor to determine whether the rotational speed complies with a desired rotational speed;

generating a motor control signal in response to the determination of compliance of the rotational speed and the desired rotational speed;

monitoring an input current to the dc motor to determine whether a predicted input current complies with an input current limit range; and modifying the motor control signal by a first control decay factor when it is determined that the input current exceeds the input current limit range.

22. The method of claim 21, further comprising modifying the motor control signal by a second control decay factor when it is determined that the predicted input current is substantially within the input current limit range.

23. The method of claim 22, wherein the act of modifying the motor control signal by a first control decay factor comprises modifying the control motor signal by a factor between substantially 0.99 and 0.95.

24. The method of claim 23, wherein the act of modifying the motor control signal by a second control decay factor comprises modifying the control motor signal by a factor between substantially 1.0 and 0.97.

25. The method of claim 24, wherein the act of monitoring an input current comprises determining whether the predicted input current is within ten percent of an input current rating for the dc motor.

26. The method of claim 25, wherein the act of monitoring an input current comprises determining whether the predicted input current is within five percent of an input current rating for the dc motor.

27. The method of claim 26, wherein the act of monitoring an input current comprises predicting an input current to the dc motor based on an input current to the dc motor according to a first order approximation.

28. The method of claim 27, wherein the act of monitoring an input current comprises predicting an input current to the dc motor based on an input current to the dc motor according to a second order approximation.

* * * * *